US008664091B2

(12) United States Patent
Zhu et al.

(10) Patent No.: US 8,664,091 B2
(45) Date of Patent: Mar. 4, 2014

(54) METHOD FOR REMOVING METALLIC NANOTUBE

(75) Inventors: Huilong Zhu, Poughkeepsie, NY (US); Zhijiong Luo, Poughkeepsie, NY (US); Haizhou Yin, Poughkeepsie, NY (US)

(73) Assignee: Institute of Microelectronics, Chinese Academy of Sciences, Beijing (CN)

( * ) Notice: Subject to any disclaimer, the term of this patent is extended or adjusted under 35 U.S.C. 154(b) by 0 days.

(21) Appl. No.: 13/504,043

(22) PCT Filed: Nov. 21, 2011

(86) PCT No.: PCT/CN2011/082533
§ 371 (c)(1),
(2), (4) Date: Apr. 25, 2012

(87) PCT Pub. No.: WO2013/067720
PCT Pub. Date: May 16, 2013

(65) Prior Publication Data
US 2013/0122690 A1    May 16, 2013

(30) Foreign Application Priority Data
Nov. 10, 2011    (CN) .......................... 2011 1 0354410

(51) Int. Cl.
*H01L 21/479*    (2006.01)

(52) U.S. Cl.
USPC .......... 438/466; 977/742; 977/842; 977/888; 977/936; 977/938; 977/940; 257/E51.04; 257/E23.074

(58) Field of Classification Search
USPC ................ 977/842, 888, 938, 940, 742, 936; 438/466; 257/E51.04, E23.074
See application file for complete search history.

(56) References Cited

U.S. PATENT DOCUMENTS

| 6,918,284 B2 * | 7/2005 | Snow et al. .................. 73/31.05 |
| 6,921,684 B2 * | 7/2005 | Dubin ............................ 438/142 |
| 7,091,096 B2 * | 8/2006 | Balasubramanian et al. 438/292 |
| 7,462,890 B1 * | 12/2008 | Tombler et al. ............... 257/192 |

(Continued)

FOREIGN PATENT DOCUMENTS

| CN | 1886332 A | 12/2006 |
| CN | 1903715 B | 6/2010 |

(Continued)

OTHER PUBLICATIONS

Collins et al., "Engineering Carbon Nanotubes and Nanotube Circuits Using Electrical Breakdown", Science 292, pp. 706-709 (Apr. 2001).*

(Continued)

*Primary Examiner* — Marvin Payen
*Assistant Examiner* — Victor Barzykin
(74) *Attorney, Agent, or Firm* — Osha Liang LLP

(57) ABSTRACT

A method for removing a metallic nanotube, which is formed on a substrate in a first direction, includes forming a plurality of conductors in a second direction crossing the first direction, electrically contacting the plurality of conductors with metallic nanotube, respectively, forming at least two voltage-applying electrodes on the conductors, each of which electrically contacting at least one of the conductors, and applying voltages to at least some of the conductors through the voltage-applying electrodes, respectively. Among the conductors to which the voltages are respectively applied, every two adjacent conductors have an electrical potential difference created therebetween, so as to burn out the metallic nanotube.

10 Claims, 5 Drawing Sheets

(56) References Cited

U.S. PATENT DOCUMENTS

| | | | |
|---|---|---|---|
| 7,598,544 B2 * | 10/2009 | Bertin et al. | 257/213 |
| 7,732,290 B2 * | 6/2010 | Tombler et al. | 438/302 |
| 7,736,943 B2 * | 6/2010 | Tombler et al. | 438/100 |
| 7,855,403 B2 * | 12/2010 | Bertin et al. | 257/213 |
| 8,110,883 B2 * | 2/2012 | Ward et al. | 257/428 |
| 8,168,495 B1 * | 5/2012 | Lim et al. | 438/268 |
| 8,262,898 B2 * | 9/2012 | Ashitomi | 205/768 |
| 2002/0173083 A1 * | 11/2002 | Avouris et al. | 438/129 |
| 2010/0044679 A1 * | 2/2010 | Buh et al. | 257/24 |
| 2010/0059736 A1 * | 3/2010 | Tombler, Jr. | 257/14 |
| 2010/0065820 A1 * | 3/2010 | Tombler, Jr. | 257/24 |
| 2010/0171099 A1 * | 7/2010 | Tombler et al. | 257/40 |
| 2010/0270536 A1 * | 10/2010 | Tombler, Jr. | 257/24 |
| 2011/0217827 A1 * | 9/2011 | Tombler, Jr. | 438/466 |

FOREIGN PATENT DOCUMENTS

| | | |
|---|---|---|
| CN | 101667611 B | 7/2011 |
| CN | 101788516 B | 10/2012 |
| WO | 2010/108631 A2 | 9/2010 |

OTHER PUBLICATIONS

International Search Report and Written Opinion issued by the China Patent Office on Nov. 10, 2011, in related Chinese Patent Application No. PCT/CN2011/082533 (8 pages).

* cited by examiner

US 8,664,091 B2

METHOD FOR REMOVING METALLIC NANOTUBE

CROSS-REFERENCE TO RELATED APPLICATION(S)

This application claims priority to Chinese Application No. 201110354410.2, filed on Nov. 10, 2011, entitled "METHOD FOR REMOVING METALLIC NANOTUBE," which is incorporated herein by reference in its entirety.

TECHNICAL FIELD

The present disclosure relates to the semiconductor device field, and particularly, to a method for removing metallic nanotubes from a mixture of semiconductor nanotubes and metallic nanotubes.

BACKGROUND

Carbon Nanotube Field Effect Transistors (CNFETs) are attracting more and more attentions due to their power and performance benefits. However, existing Carbon NanoTube (CNTs) growing techniques may produce a mixture of metallic CNTs (m-CNTs) and semiconductor CNTs (s-CNTs). m-CNTs may lead to source-drain shorts in CNFETs, resulting in excessive leakage and highly degraded noise margins. Thus, there is a need for m-CNT removal after growth of CNTs.

Existing techniques for m-CNT removal include CNT sorting, selective chemical etching, Single-Device electrical Breakdown (SDB), VLSI-compatible Metallic-CNT Removal (VMR), and the like. However, some of the existing techniques do not sufficiently remove m-CNTs. Some may also introduce restrictions. For example, the CNT sorting technique may impose restrictions on radial CNT alignment, and the selective chemical etching technique may impose restrictions on narrow CNT diameter distributions. The SDB technique can achieve almost 100% m-CNT removal, but is not VLSI compatible. The VMR technique is VLSI-compatible, but may introduce significant area penalties up to 200% when applied to full-wafer-scale.

In view of the above, there is a need for a method for removing metallic nanotubes to efficiently remove the metallic nanotubes, so as to quickly remove the metallic nanotubes at full-wafer-scale without area penalties.

SUMMARY

The present disclosure provides, among others, a method for removing metallic nanotubes, to overcome at least some of the problems in the existing techniques as described above.

According to an aspect of the present disclosure, there is provided a method for removing a metallic nanotube which is formed on a substrate in a first direction. The method may comprise: forming a plurality of conductors in a second direction crossing the first direction, the conductors electrically contacting the metallic nanotube, respectively; forming at least two voltage-applying electrodes on the conductors, each of the voltage-applying electrodes electrically contacting at least one of the conductors; and applying voltages to at least some of the conductors through the voltage-applying electrodes, respectively, wherein among conductors to which the voltages are respectively applied, every two adjacent conductors have an electrical potential difference created therebetween, so as to burn out the metallic nanotube.

According to embodiments of the present disclosure, it is possible to burn out the metallic nanotube by creating a sufficiently high potential difference between at least some of the conductors so that a relatively large current passes through the metallic nanotube. As a result, it is possible to efficiently remove the metallic nanotube without imposing additional area penalties.

BRIEF DESCRIPTION OF THE DRAWINGS

The above and other objects, features, and advantages of the present disclosure will become apparent from following descriptions of embodiments with reference to the attached drawings, in which.

DETAILED DESCRIPTION

Figure 1:
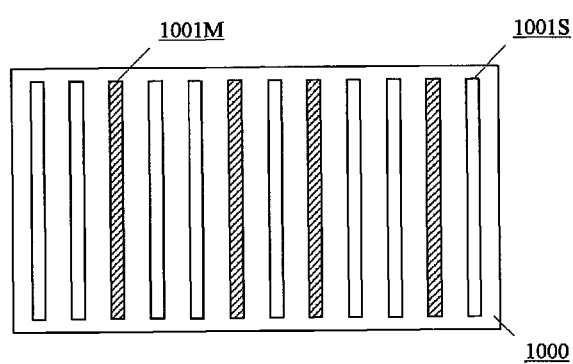
FIG. 1 is a schematic view showing nanotubes (including semiconductor nanotubes and metallic nanotubes) formed on a substrate according to an embodiment of the present disclosure.

Hereinafter, descriptions are given with reference to embodiments shown in the attached drawings. However, it is to be understood that these descriptions are illustrative and not intended to limit the present disclosure. Further, in the following, known structures and technologies are not described to avoid obscuring the present disclosure unnecessarily.

In the drawings, various structures according to the embodiments are shown. However, they are not drawn to scale, and some features may be enlarged while some features may be omitted for sake of clarity. Moreover, shapes and relative sizes and positions of regions shown in the drawings are also illustrative, and deviations may occur due to manufacture tolerances and technique limitations in practice.

As shown in FIG. 1, on a substrate 1000 (for example, a bulk Si substrate or a Si wafer), an oxide layer (now shown) may be deposited, and then nanotubes may be grown on the oxide layer to extend in a first direction (the vertical direction shown in FIG. 1). The nanotubes may comprise semiconductor nanotubes 1001S and metallic nanotubes 1001M. The growth of the nanotubes per se is known to those skilled in the art, and thus detailed descriptions thereof are omitted here. It is to be noted that the metallic nanotubes 1001M can appear and be distributed in a random manner.

Figure 2:
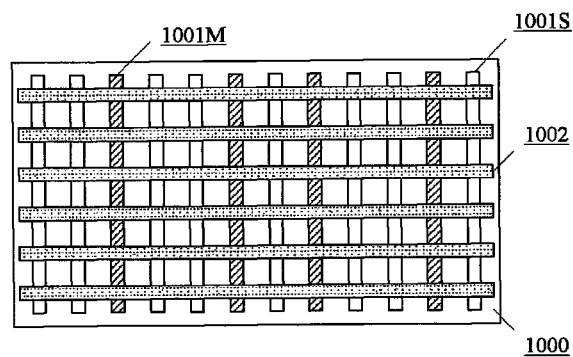
FIG. 2 is a schematic view showing formation of conductors on the substrate according to an embodiment of the present disclosure.

Then, as shown in FIG. 2, a plurality of conductors 1002 may be formed in a second direction crossing (e.g., perpendicular to) the first direction, which is shown in FIG. 2 as the horizontal direction. Those conductors 1002 can electrically contact the underlying nanotubes, especially, the metallic nanotubes 1001M. For example, the conductors 1002 may be made from any one or more selected from a group comprising Pd, Pt, TiN, Cu, Al and Ag. For example, the conductors 1002 may be formed by depositing a conductive material layer on the structure shown in FIG. 1 and then patterning the conductive material layer.

For convenience of manufacture, the conductors 1002 can be formed as parallel bar-shaped conductors as shown in FIG. 2, and each of the conductors 1002 can span across all the nanotubes (and thus electrically contacts the respective metallic nanotubes 1001M in the horizontal direction). However, the arrangement of the conductors 1002 is not limited to that shown in FIG. 2. For example, the conductors 1002 are not limited to bar-shaped ones, but may be shaped in any suitable forms. Further, it is not necessary for all of the conductors 1002 to have a length in the horizontal direction to cover all the nanotubes. Instead, at least some of the conductors 1002 can have a length to cover and thus electrically contact only some of the nanotubes (especially, the metallic nanotubes), as to be described in the following.

Figure 3:
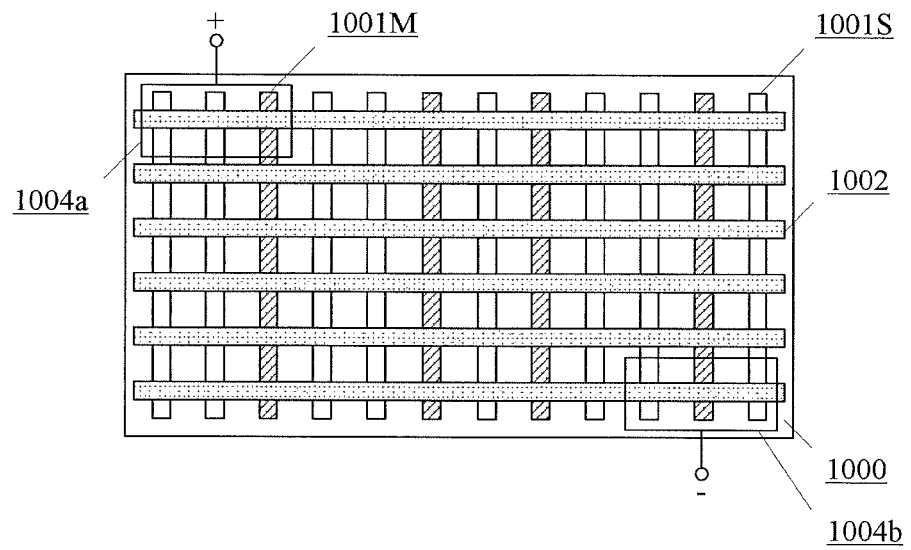
FIG. 3 is a schematic view showing formation of voltage-applying electrodes on the conductors according to an embodiment of the present disclosure.

Next, as shown in FIG. 3, voltage-applying electrodes 1004a and 1004b may be formed on the conductors 1002. In the example shown in FIG. 3, the voltage-applying electrode 1004a electrically contacts the uppermost conductor 1002, and the voltage-applying electrode 1004b electrically contacts the lowermost conductor 1002. Thus, it is possible to create an electrical potential difference between the uppermost conductor and the lowermost conductor by, for example, applying a positive voltage to the voltage-applying electrode 1004a and a negative voltage to the voltage-applying electrode 1004b, or vice versa.

An electrical current may pass through portions of the respective metallic nanotubes 1001M between the uppermost and lowermost conductors 1002 due to the electrical potential difference created between those two conductors 1002. The applied voltages and thus the electrical potential difference between those two conductors 1002 can be controlled in such a manner that the current passing though the metallic nanotubes 1001M is large enough to burn out the metallic nanotubes 1001M. As a result, it is possible to efficiently remove the metallic nanotubes 1001M.

In the example shown in FIG. 3, only the uppermost and lowermost conductors 1002 electrically contact the voltage-applying electrodes 1004a and 1004b, respectively, and thus have the voltages respectively applied thereon, but the remaining conductors 1002 have no voltage applied thereon. However, the present disclosure is not limited thereto. Instead, the voltages can be applied to more conductors 1002, respectively. According to an embodiment of the present disclosure, it is possible to create an electrical potential between adjacent ones among conductors to which the voltages are respectively applied so that an electrical current passes through and thus burns out portions of the respective metallic nanotubes between those adjacent conductors.

Here, it is to be noted that the called "positive" and "negative" voltages are defined relative to each other, but do not necessarily mean that their values are positive or negative. For example, of two voltages different from each other, one which is relatively high can be referred to as a "positive" voltage, and the other which is relatively low can be referred to as a "negative" voltage. Further, expressions such as "adjacent ones among conductors to which the voltages are respectively applied", "among conductors to which the voltages are respectively applied, adjacent conductors" and the like refer to conductors adjacent to each other among conductors to which the voltages are respectively applied, conductors to which no voltage is applied being omitted. For example, in the case shown in FIG. 3, among conductors to which the voltages are respectively applied (i.e., the uppermost and lowermost conductors) but omitting conductors to which no voltage is applied (i.e., the conductors between the uppermost and lowermost conductors), the uppermost and lowermost conductors are "adjacent" to each other.

Figure 4:
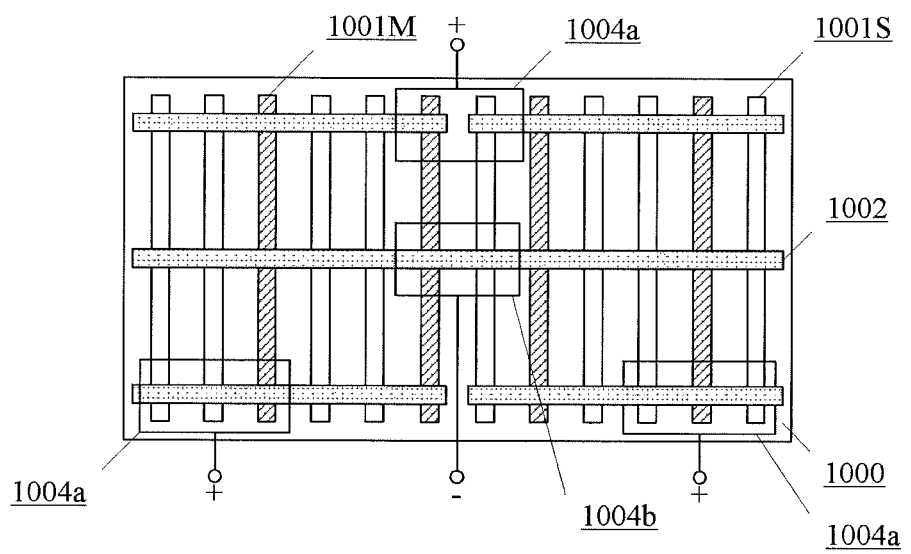
FIG. 4 is a schematic view showing formation of conductors on the substrate and further formation of voltage-applying electrodes on the conductors according to another embodiment of the present disclosure.

In the example shown in FIG. 3, only two voltage-applying electrodes are formed. However, the present disclosure is not limited thereto. Instead, more voltage-applying electrodes can be formed. FIG. 4 shows an example where 4 voltage-applying electrodes are formed. Further, in the example shown in FIG. 4, the uppermost and lowermost conductors do not cover all the nanotubes in the horizontal direction along the length.

It is to be noted that in the example shown in FIG. 4 both the feature of more than two voltage-applying electrodes and the feature of not all of the nanotubes being covered in the horizontal direction are incorporated for convenience of descriptions. However, as will be appreciated by those skilled in the art, it does not necessarily mean that those two features should be incorporated in combination into a single one embodiment. Instead, they can be implemented separately.

In the example shown in FIG. 3, in view of the voltage drop across the conductors 1002 and the metallic nanotubes 1001M, the created potential differences at positions distant from the voltage-applying electrodes 1004a and 1004b may be reduced, resulting in reduced current density in the metallic nanotubes. To avoid reduction of the current density, it is possible to increase the number of contacts between the voltage-applying electrodes and the conductors.

In a case where the number of contacts between the voltage-applying electrodes and the conductors are increased, an insulating layer may be interposed between the conductor layer and the voltage-applying electrode layer and then may be patterned to form electrical contacts between the conductors and the voltage-applying electrodes, so as to apply the voltages properly. It is apparent that such an insulating layer may be incorporated into the example shown in FIG. 3 or FIG. 4.

Figure 5:
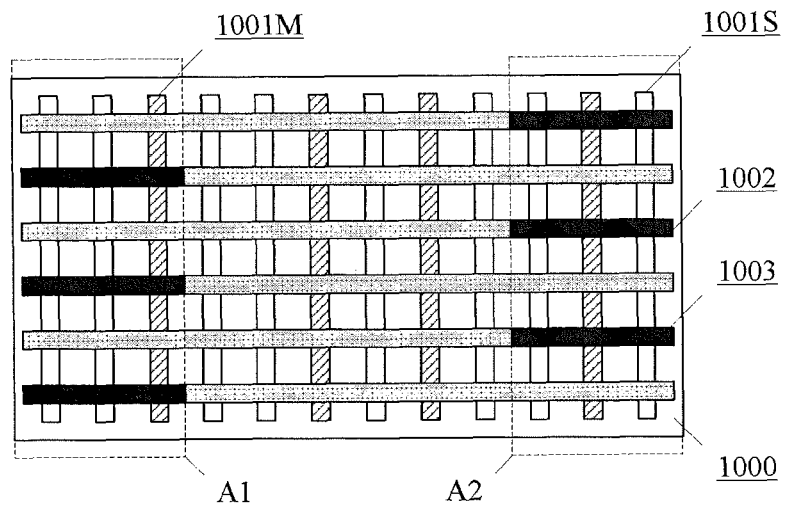
FIGS. 5-6 are schematic views showing formation of an insulating layer on the conductors and further formation of voltage-applying electrodes on the insulating layer according to an embodiment of the present disclosure, respectively.

For example, referring to FIG. 5, an insulating layer such as a nitride layer, an oxide layer and a nitroxide layer (not shown) may be formed on the structure shown in FIG. 2, and may be patterned to expose the conductors 1002 at specific positions. Specifically, as shown in FIG. 5 (where the insulating layer is not shown for clarity), two regions which are not overlapped with each other may be selected, i.e., a first region A1 and a second region A2. In the first region A1, the insulating layer may be patterned so that at least portions (portions 1003 shown in the drawings in black) of respective even numbered conductors 1002 in the first direction (the 2nd, 4th and 6th conductors from the top down in the drawing) are exposed; while in the second region A2, the insulating layer may be patterned so that at least portions (portions 1003 shown in the drawings in black) of respective odd numbered conductors 1002 in the first direction (the 1st, 3rd and 5th conductors from the top down in the drawing) are exposed.

Figure 6:
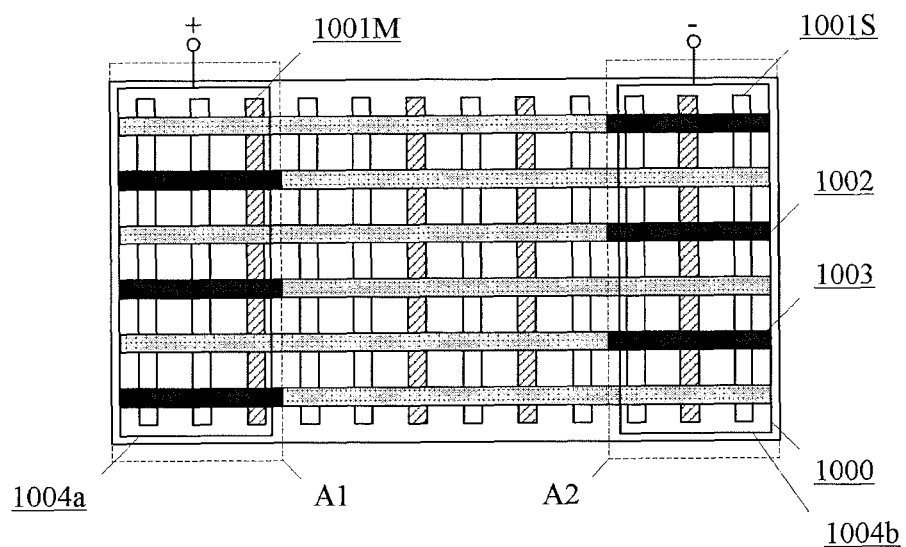

Then, as shown in FIG. 6, voltage-applying electrodes 1004a and 1004b may be formed on the first region A1 and the second region A2, respectively. As a result, in the first region A1, the voltage-applying electrode 1004a makes electrical contacts with the exposed portions of the even numbered conductors 1002, and in the second region A2, the voltage-applying electrode 1004b makes electrical contacts with the exposed portions of the odd numbered conductors 1002.

Thus, it is possible to create an electrical potential difference between the respective even numbered conductors and the respective odd numbered conductors by, for example, applying a positive voltage to the voltage-applying electrode 1004a and a negative voltage to the voltage-applying electrode 1004b, or vice versa. In such a case, every two adjacent conductors 1002 have an electrical potential difference created therebetween.

Because every two adjacent conductors 1002 have an electrical potential difference created therebetween as described above, an electrical current passes through portions of the respective metallic nanotubes 1001M between every two adjacent conductors 1002. The applied voltages and thus the potential differences created between the adjacent conductors can be controlled so that the electrical current passing through the metallic nanotubes 1001M is large enough to burn out the metallic nanotubes 1001M. As a result, it is possible to efficiently remove the metallic nanotubes 1001M.

Figure 7:
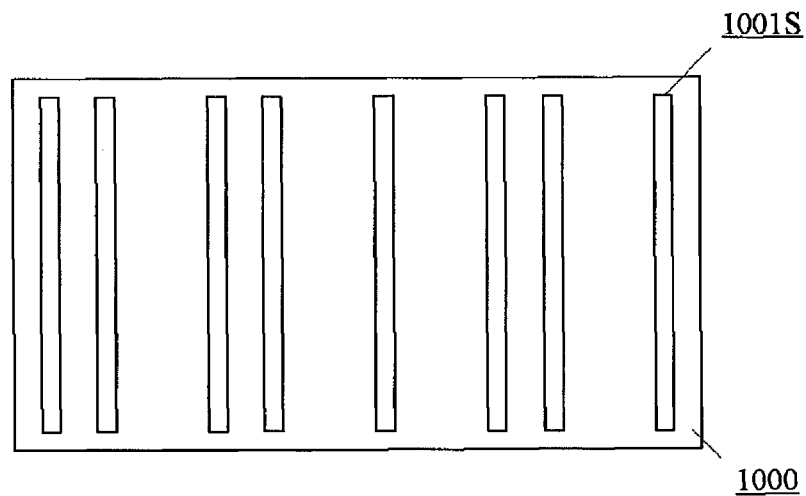
FIG. 7 is a schematic view showing the substrate with the metallic nanotubes removed according to an embodiment of the present disclosure.

Finally, as shown in FIG. 7, the voltage-applying electrode 1004a and 1004b, the insulating layer, and the conductors 1002 may be removed. Such removal may be done by selective etching, for example. Then, there are only the semiconductor nanotubes 1001S left on the substrate 1000, with the metallic nanotubes 1001M burned out.

Figure 8:
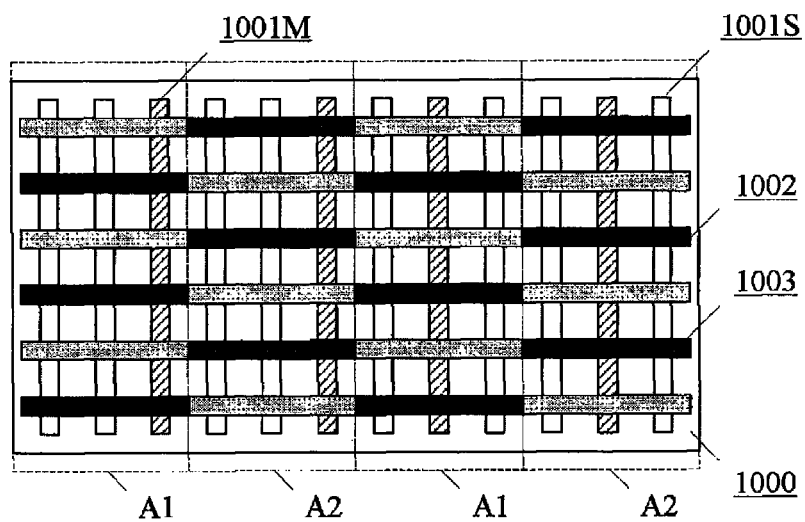
FIGS. 8-9 are schematic views showing different forms of voltage-applying electrodes according to further embodiments of the present disclosure, respectively.

In the example shown in FIG. 6, each of the conductors makes an electrical contact with only one of the voltage-applying electrodes. To further increase the current density in the metallic nanotubes, each of the conductors may make electrical contacts with more voltage-applying electrodes. For example, as shown in FIG. 8, first regions A1 and second regions A2 may be arranged alternately in the second direction, and voltage-applying electrodes may be formed on those regions, respectively. In the example shown in FIG. 8, each of the conductors 1002 can make electrical contacts with two of the voltage-applying electrodes. It is apparent for those skilled in the art that more voltage-applying electrodes can be formed and thus more electrical contacts can be made.

In FIG. 8, the voltage-applying electrodes formed on the first regions A1 and the second regions A2 are not shown for clarity. Further, although in FIG. 8 the first regions A1 and the second regions A2 are shown to abut against each other, the first region A1 and the second region A2 adjacent to each other may be separated from each other by a distance.

According to some embodiments of the present disclosure, at least some of the conductors 1002 have electrical potential differences created therebetween, which are large enough so that a relatively large electrical current passes through and thus burns out the metallic nanotubes 1001M. As a result, it is possible to efficiently remove the metallic nanotubes, without additional area penalties. Further, to more efficiently remove the metallic nanotubes, among conductors to which the voltages are respectively applied, two conductors which are most distant to each other may have a distance therebewteen (for example, the distance between the uppermost one among conductors to which the voltages are respectively applied and the lowermost one among conductors to which the voltages are respectively applied) to cover main bodies of the metallic nanotubes, so that an electrical current can passes through and thus burn out the main bodies of the metallic nanotubes.

According to some embodiments of the present disclosure, among conductors 1002 to which the voltages are respectively applied (through the voltage-applying electrodes), if two adjacent conductors have different voltage applied thereto (that is, they are connected to different voltage-applying electrodes) and thus have an electrical potential difference created therebetween, then an electrical current may pass therethough and thus burn out a portion of a metallic nanotube between those two conductors. The voltage-applying electrodes can be configured in any suitable form and any suitable arrangement as far as the electrical potential can be established properly.

Figure 9:
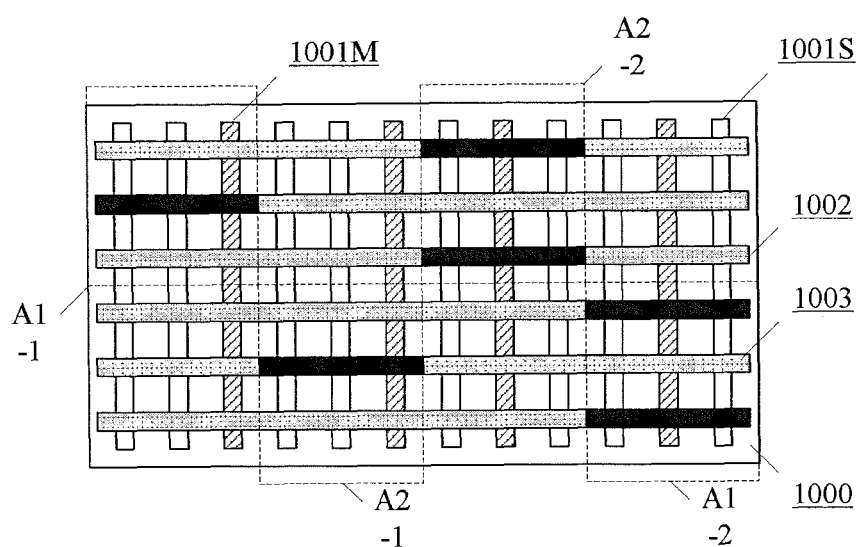

FIG. 9 shows an example where a first region A1 comprises sub-regions A1-1 and A1-2 and a second region A2 comprises sub-regions A2-1 and A2-2. For each of the regions, the sub-regions thereof do not cover a continuous area. It is also possible to implement the method disclosed herein by forming voltage-applying electrodes (not shown) on the respective sub-regions and applying respective voltages. Although in the example shown in FIG. 9 each of the regions comprises only two sub-regions, it can comprise more sub-regions. Further, the two regions may have sub-regions different in number. Alternatively, one of the regions may cover a continuous area as described above, while the other of the regions may comprise several sub-regions. Furthermore, the respective sub-regions do not necessarily abut against each other in the second direction as shown in FIG. 9.

In the above descriptions, details of patterning and etching are not described. It is understood by those skilled in the art that various measures may be utilized to form the layers and regions in desired shapes.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for removing a metallic nanotube which is formed on a substrate in a first direction, the method comprising:
    forming a plurality of conductors in a second direction crossing the first direction, the conductors electrically contacting the metallic nanotube, respectively;
    forming an insulating layer to cover the conductors;
    patterning the insulating layer to expose a first conductor or a first group of conductors out of the plurality of the conductors in a first region and to expose a second conductor or a second group of conductors, different from the first conductor or the first group of conductors, out of the conductors in a second region different from the first region;
    forming a first voltage-applying electrode on the insulating layer in the first region and a second voltage-applying electrode on the insulating layer in the second region, so that the first voltage-applying electrode electrically contracts the first conductor or the first group of conductors via the patterned insulating layer, and the second voltage-applying electrode electrical contacts the second conductor or the second group of conductors via the patterned insulating layer;
    applying different voltages to the first and second voltage-applying electrodes, respectively, to burn out the metallic nanotube; and
    removing the voltage-applying electrodes, the insulating layer and the conductors.

2. The method according to claim 1, wherein the conductors are made from any one or more selected from a group comprising Pd, Pt, TiN, Cu, Al and Ag.

3. The method according to claim 1, wherein the insulating layer comprises nitride, oxide or nitroxide.

4. The method according to claim 1, wherein the voltage-applying electrodes are made from any one or more selected from a group comprising Pd, Pt, TiN, Cu, Al and Ag.

5. The method according to claim 1, wherein the first and second voltage-applying electrodes are arranged adjacent to each other in the second direction.

6. The method according to claim 1, wherein a plurality of metallic nanotubes are formed on the substrate, and wherein each of the conductors electrically contacts all of the plurality of the metallic nanotubes.

7. The method according to claim 1, wherein among conductors to which the voltages are respectively applied through the voltage-applying electrodes, two most distant conductors have a distance therebetween to cover main body of the metallic nanotube.

8. The method according to claim 1, wherein among conductors to which the voltages are respectively applied through the voltage-applying electrodes, every two adjacent conductors have an electrical potential difference created therebetween.

9. The method according to claim 1, further comprising:
patterning the insulating layer to further expose a third conductor or a third group of conductors out of the plurality of the conductors in a third region different from the first and second regions,
further forming a third voltage-applying electrode on the insulating layer in the third region, so that the third voltage-applying electrode electrically contacts the third conductor or the third group of conductors via the patterned the insulating layer; and
applying a further voltage to the third voltage-applying electrode.

10. The method according to claim 9 wherein among conductors to which the voltages are respectively applied through the voltage-applying electrodes,
each of the conductors electrically contacts at least one of the voltage-applying electrodes, and
every two adjacent conductors electrically contact different ones of the voltage-applying electrodes, respectively.

* * * * *